United States Patent [19]

Liu et al.

[11] Patent Number: 4,594,597

[45] Date of Patent: Jun. 10, 1986

[54] THERMAL PRINTER

[75] Inventors: Dean-Yuan Liu, Canoga Park; Jon S. Guy, Garden Grove; Howard W. H. Siu, S. San Gabriel; Michael A. Shaver, Santa Fe Springs, all of Calif.

[73] Assignee: Sanders Associates, Inc., Nashua, N.H.

[21] Appl. No.: 765,079

[22] Filed: Aug. 13, 1985

[51] Int. Cl.[4] .............................................. G01D 15/10

[52] U.S. Cl. ............................... 346/76 PH; 346/106; 400/224.2; 400/240.3

[58] Field of Search .................. 346/76 PH, 136, 106; 400/120, 224.2, 240.3, 240.4, 578, 622–623; 101/408–412; 219/216 PH

[56] References Cited

U.S. PATENT DOCUMENTS 4,388,628 6/1983 Moriguchi et al. ............ 346/76 PH
4,496,955 6/1985 Maeyama et al. ............. 346/76 PH
4,517,590 5/1985 Nagashima et al. ........... 346/76 PH
4,532,525 7/1985 Takahashi ...................... 346/76 PH
4,536,772 8/1985 Isogai ............................ 346/76 PH
4,543,004 9/1985 Brandenburg et al. ............. 400/649

*Primary Examiner*—E. A. Goldberg
*Assistant Examiner*—A. Evans
*Attorney, Agent, or Firm*—Louis Etlinger; Wm. F. Porter, Jr.

[57] ABSTRACT

A thermal printer of the three-pass variety for printing in color featuring a sheet feeder, automatic registration, and ejection of the sheet when printing is complete. A rotatable, cylindrical drum has the print head close adjacent thereto and includes a releasable clamp for receiving the paper from the sheet feeder. The paper is clamped to the drum and the drum rotated past the print head three times, one for each color. The drum is then rotated to release and eject the paper. Sensors are provided to detect and monitor the position of the drum during its printing operation and to monitor the status of the paper supplied to the clamping mechanism.

7 Claims, 15 Drawing Figures

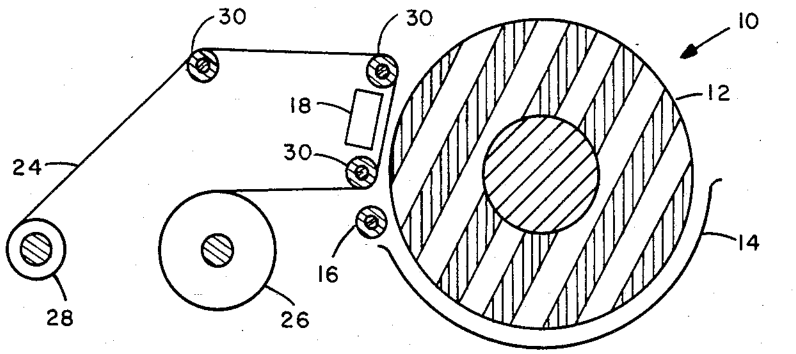
PRIOR ART
FIG. 1
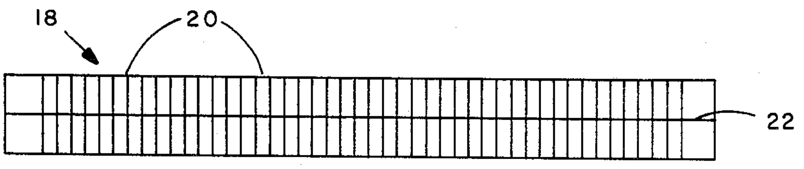
FIG. 2 PRIOR ART
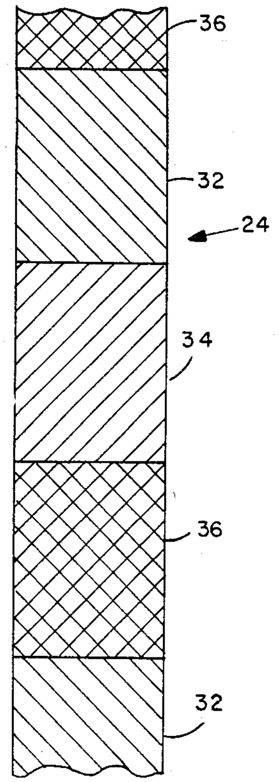
FIG. 3 PRIOR ART
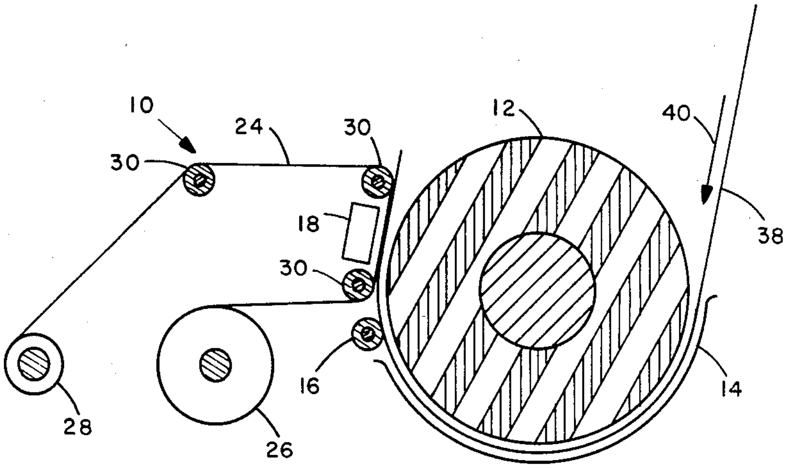
FIG. 4 PRIOR ART
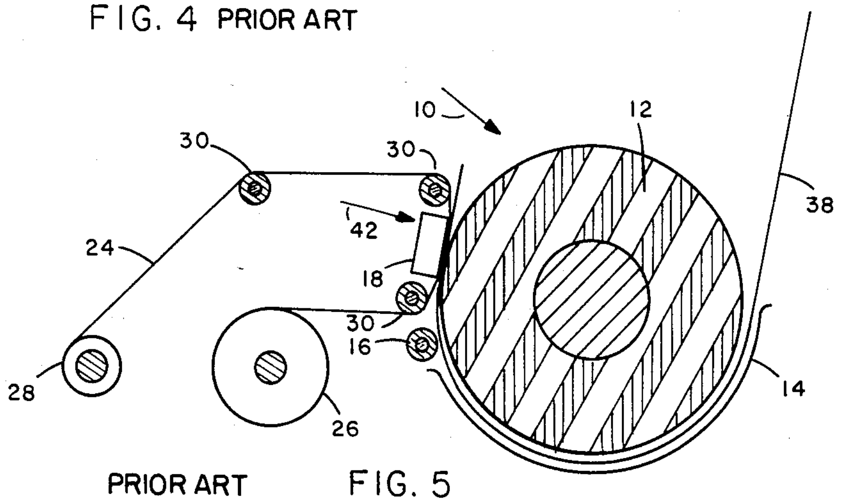
PRIOR ART FIG. 5

THERMAL PRINTER

BACKGROUND OF THE INVENTION

The present invention relates to thermal printers and, more particularly, to a thermal printer for printing a plurality of colors (three colors in the currently preferred embodiment) on individual sheets of print receiving media—for example, sheets of paper—fed by a sheet feeder and utilizing a rotating drum with a clamp for holding and rotating the sheet past the thermal print head a plurality of times in the same direction and then reversing direction to release and eject the printed sheet.

Thermal printers are a rapidly emerging technology for printing in color at low cost. The typical prior art approach to thermal printers is shown in FIGS. 1–7. As shown in FIG. 1, the basic elements of a prior art thermal printer 10 are a rotatable platen 12 very similar to the platens employed in a standard typewriter. A paper feed guide 14 and pressure roller 16 are disposed adjacent the platen 12 to be employed in a manner to be discussed shortly. A printed circuit thermal print head such as that indicated as 18 in FIG. 2 is disposed close adjacent the surface of the platen 12 and parallel thereto. Print head 18 has a plurality of addressable vertical wires 20 and a single, horizontal wire 22 formed therein adjacent the surface closest to the platen 12. By sending current through the horizontal wire 22 and one of the addressable wires 20, the intersection of the two can be heated at a selected point along the length of the platen. A specialized print ribbon 24 as shown in FIG. 3 is disposed to pass from a supply roller 26 to a take up roller 28 passing over guide rollers 30 and passing between the print head 18 and platen 12. The print ribbon 24 has three colors in repeatable sequence designated as 32, 34, and 36. Typically, the three colors are magenta, yellow and cyan. The ribbon 24 is a thin backing strip which faces the print head 18 having the colors 32, 34, 36 as a thin heat-transferrable wax coating on the side facing the platen 12. The ribbon 24 in, for example, a printer designed to print standard $8\frac{1}{2}\times11$ sheets of paper has each of the color segments approximately thirteen inches long disposed on a ribbon which is approximately eight and one-quarter inches wide.

The sequence of operation is shown in FIGS. 4–7. A sheet of paper 38 (single sheet or fan fold) is fed into the space between the platen 12 and paper feed guide 14 in the direction of arrow 40 as shown in FIG. 4. Pressure roller 16 forces the paper 38 against the surface of platen 12 which is then rotated (manually as in the case of a typewriter) to position the paper 38 at a top of paper position adjacent the print head 18. The print ribbon 24 is then positioned with the top of the first color 32 positioned at the top of the paper sheet 38. A mechanism (not shown) then forces the print head 18 against the ribbon 24, paper 38, and platen 12 in the direction of arrow 42 as shown in FIG. 5. The horizontal wire 22 and addressable vertical wires 20 of the print head 18 are then addressed sequentially across the print head 18 according to a control signal providing a line of print information from a computer or the like (not shown) to cause the individual pixel positions across the platen 12 at the intersection of the various wires 20, 22 to heat and cause the wax of first color 32 to be melted into the paper 38 along the first line to be printed. The longer a single pixel position is heated, the more wax is transferred to the paper 38 and, consequently, the bigger the dot of color at that position. These are all techniques well known in the art and are provided for general information purposes only. As shown in FIG. 6, the print head 18 is then withdrawn from the contact and print position of FIG. 5 to the withdrawn position as indicated by the arrow 44. The ribbon 24 is then advanced in the direction of arrow 46 while the paper 38 is advanced one line by rotating the platen 12 as indicated by the arrows 48. Initially, the ribbon 24 and paper 38 remain stuck together due to the melting of the wax surface. As the advancing of the ribbon 24 and paper 38 continues, however, the two are pulled apart. When the paper 38 and ribbon 24 have been advanced one line, the print action as described above with reference to FIG. 5 is repeated. The ribbon 24 and paper 38 are then advanced once again as described with respect to FIG. 6. This print and feed sequence of FIGS. 5 and 6 is repeated until the first color 32 has been completely printed on the sheet of paper 38. As shown in FIG. 7, the paper 38 is then rewound in the direction of arrows 50 by rotating the platen 12 in the opposite direction until the top of the paper sheet is adjacent the print head 18 corresponding once again to the position of FIG. 4. The ribbon 24 is adjusted as necessary to place the second color 34 in alignment for printing. The sequence of FIGS. 5 and 6 is then repeated to print the second color. The paper sheet 38 is then rewound in the manner of FIG. 7 once again and the third color 36 of ribbon 24 aligned whereupon the FIGS. 5–6 sequence is repeated for a third time to print the third color.

As will be realized, this procedure is time consuming in that the paper sheet 38 must be rewound to the top of sheet twice. Additionally, there is a registration problem in that the colors 32, 34, 36 do not always align identically line by line and pixel position by pixel position such that color ghosting occurs on the document as printed.

In another prior art approach of which the assignee of the present has recentlly become aware (See U.S. Pat. Nos. 4,388,628 and 4,496,955), a thermal printer drum is rotated a plurality of times in the same direction to facilitate multi-color thermal transfer from an ink donor sheet onto a recording sheet or media.

In the '628 patent, the lengths of each color ink layer on the ink donor sheet are equal to the outer circumference of the printer drum (purportedly to insure that a single color ink is applied to the sheet during each rotation of the drum). A clip is provided on the drum to grasp the receiving sheet and is released so that a stripping finger can separate the receiving sheet from the drum. Details of operation of the clip and of the stripping finger are not disclosed, nor is there discussion of the ultimate disposition and handling of the receiving sheet as it is being stripped from the drum. Further, there is no discussion regarding a mechanism for preventing misregistration (which might occur because of stretching or contraction of the ink donor sheet or because of relative "slippage" of the drum with respect to the ink donor sheet over a plurality of printing operations) of the length of ink with the leading edge of the receiving sheet.

In the '955 patent, index strips are provided adjacent each individual color frame on a web on one said thereof and at the beginning of each sequence of a set of colors on the other side of the web. Sensors are provided to detect the positions of the index strips to permit adjustment of the positions of the donor sheet or web and insure registration of the individual color frames with the sheets on which images are to be printed and to permit the donor sheet to be rewound to the start of the color sequence to permit successive multi-color printing operations to be performed using the same set of color frames. Indicia and corresponding sensors are provided to permit detection of when the printer drum is in its "home" or "start" position and in its "print" position. This patent apparently does not address itself to releasing the image receiving media.

Wherefore, it is the object of the present invention to provide a thermal printer which is simple, reliable and faster in printing by eliminating the rewinding step while, simultaneously, assuring registration on the various passes of color printing and simply and reliably effecting the release of media upon which multi-color images have been printed.

SUMMARY

The foregoing objectives have been accomplished in a thermal printer having a thermal printhead for selectively generating points of heat traversely across a print path and a driven ribbon having a transferrable print medium thereon, transported through the space between the printhead and a sheet of print paper by the improved print paper and ribbon drive of the present invention comprising: a horizontally disposed, rotatable, cylindrical drum having the printhead in close adjacent, parallel-spaced relationship to the drum's outer surface and the ribbon passing between the printhead and that outer surface; releasable clamping means for clamping the edge of a sheet of print paper to the surface of the drum; drive means for rotating the drum in a first direction (being the printing direction) and in a second direction opposite the first direction (being the release direction) and for stopping the drum at a first point with the clamping means adjacent the printhead when the drum is rotating in the printing direction (being the top of sheet point) and at a second point with the clamping means adjacent the lowest point of the drum's rotational path when the drum is rotating in the release direction (being the release point); clamp release means carried by the drum and operably connected to the drive means for releasing the clamp means only as the drum is being stopped at the release point when rotating in the release direction; first guide means for directing a sheet of print paper onto the surface with its leading edge disposed in the released clamping means when the drum is stopped at the release point; second guide means for receiving and guiding a sheet of print paper off of the surface when the drum is rotated between the top of sheet point and the release point in the release direction and the clamping means is released; means for detecting the absence of paper under the clamp means when the clamp means is in its release position and closes; and, control means connected to the drive means and the driven ribbon for rotating the drum in the print direction to clamp a sheet of paper fed into the clamp means, rotating the drum in the print direction to the top of sheet position, positioning the ribbon at the top of the first color, step rotating the drum in the print direction and stepping the ribbon in synchronization while printing the first color, line by line, positioning the ribbon at the top of the second color and step rotating the drum in the print direction and the ribbon in synchronization while printing the second color line by line, positioning the ribbon at the top of the third color, step rotating the drum in the print direction and stepping the ribbon in synchronization while printing the third color line by line, and rotating the drum in the release direction to unclamp and eject the paper sheet when finished.

DESCRIPTION OF THE DRAWINGS

FIG. 1 is a cross section through a prior art, thermal print mechanism.

FIG. 2 is a drawing of a typical prior art thermal print head.

FIG. 3 is a drawing of a portion of a prior art thermal print ribbon showing the sequence of the three colors.

FIGS. 4–7 show the manner in which the prior art mechanism of FIG. 1 thermally prints on a sheet of paper in three colors.

DESCRIPTION OF THE PREFERRED EMBODIMENT

Figure 6:
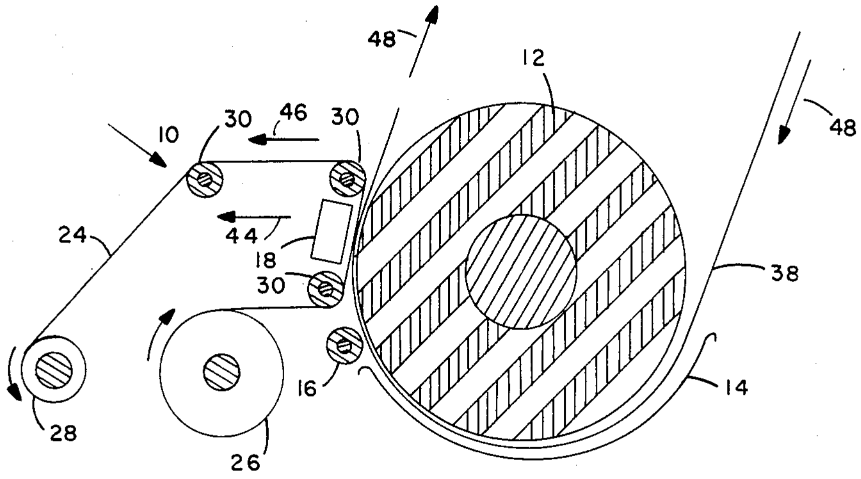
FIG. 6 PRIOR ART
Figure 7:
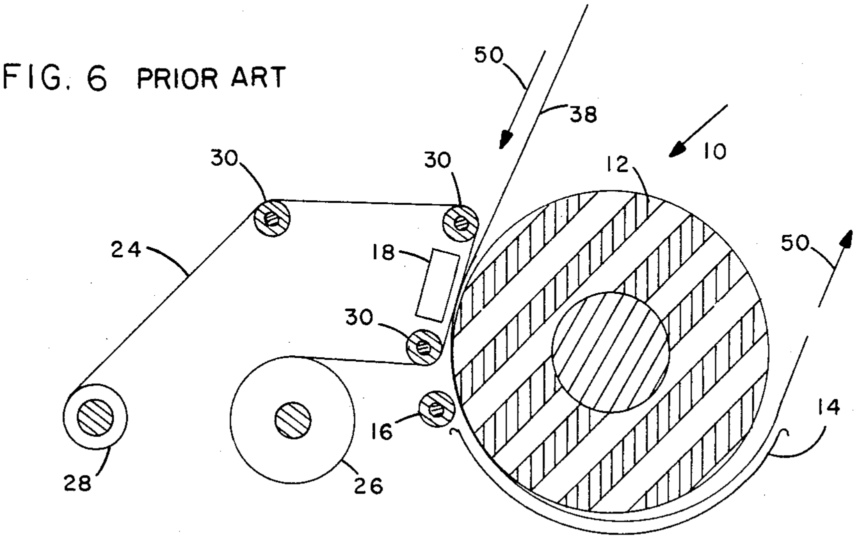
FIG. 7 PRIOR ART

Turning now to FIGS. 8–12, the basic print mechanism of the present invention is shown in simplified form. The mechanism, generally indicated as 52, consists of a rotatable drum 54 which is horizontally disposed in the manner of the platen of the previous embodiment having the printhead 18 disposed in close adjacent parallel-spaced relationship to the drum's outer surface and adapted for movement towards and away from the surface of the drum 54 by a mechanism (not shown) substantially identical to that of the prior art embodiment described above. A print ribbon 24 substantially identical to the prior art ribbon described above is mounted between a supply roller 26 and a takeup roller 28 and is disposed to pass between the printhead 18 and the black rubber surface 57 (FIG. 13) of the drum 54.

Figure 8:
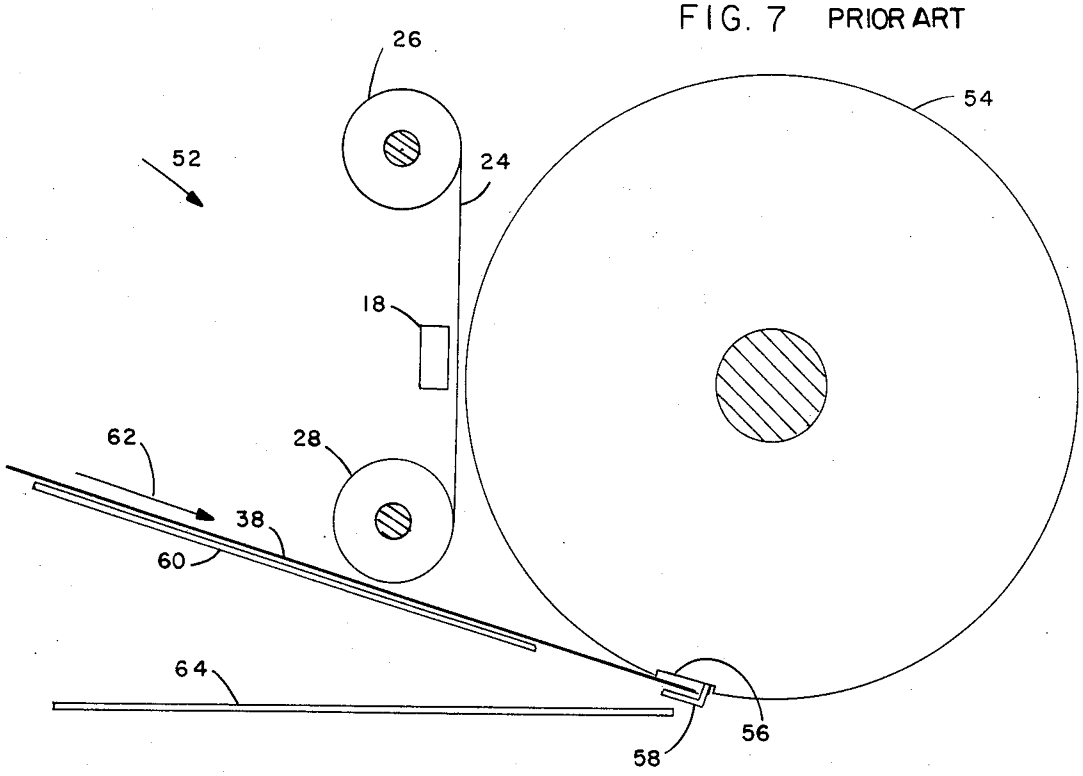
FIG. 8 is a simplified cutaway drawing of a thermal printer according to the present invention receiving a sheet of paper into the clamping means.

The drum 54 has a slot 56 longitudinally disposed in its surface in which a longitudinal clamp 58 is disposed. The clamp 58 is shown in its released position in FIG. 8. The drum 54 in FIG. 8 is shown in one of its two stopped positions—being the released position. This will be discussed in greater detail shortly. A first paper guide 60 is provided for guiding a sheet of paper 38 (in this case, a single sheet and non-fanfold) in the direction of arrow 62 such that its leading edge is directed into the clamp 58. A second paper guide 64 is provided to receive the paper 38 as it is ejected from the mechanism 52 in a manner which will be described shortly.

Figure 9:
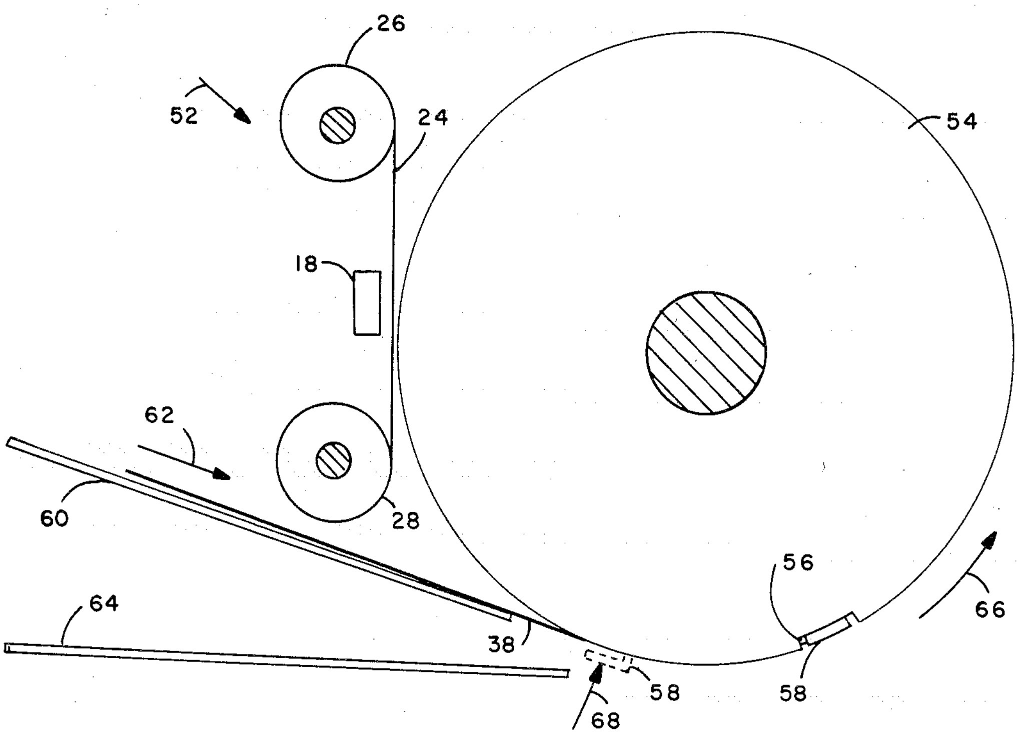
FIG. 9 shows the mechanism of FIG. 9 moving away from its release position to clamp and grip the sheet of paper.
Figure 10:
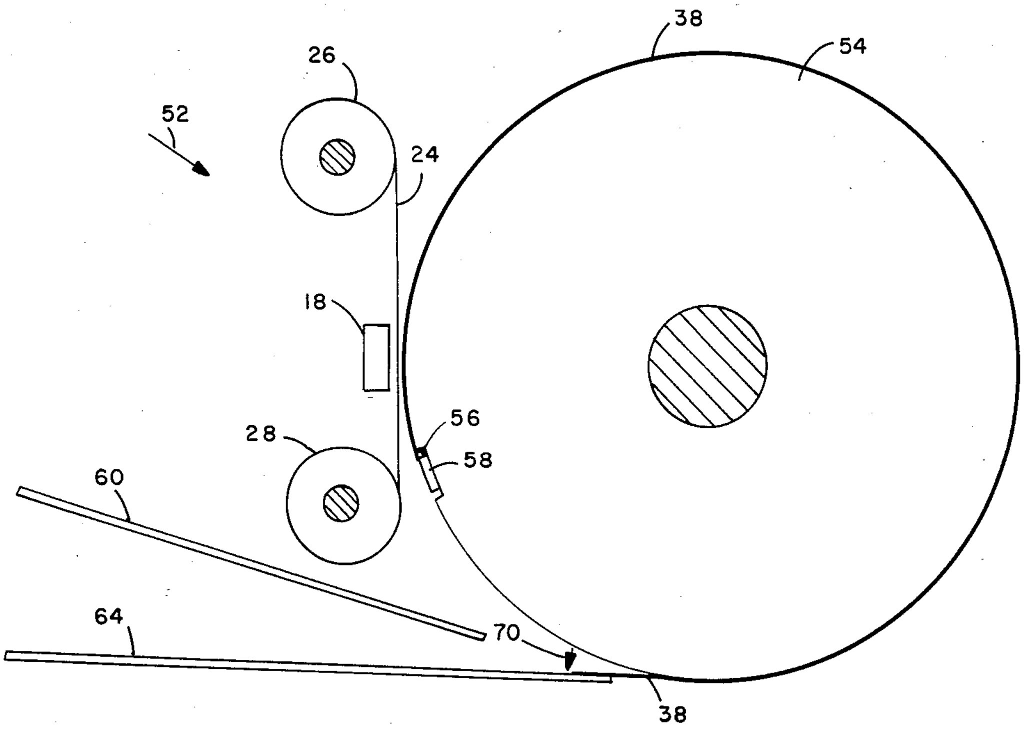
FIG. 10 shows the apparatus of FIG. 8 rotated to hold a sheet of paper at the top of sheet position.

Turning now to FIG. 9, the drum 54 is rotatable in two directions. The first direction is indicated by the arrows 66 and is the printing direction. The direction opposite arrows 66 is the releaase direction which will be discussed hereinafter. As the drum 54 is rotated in the printing direction away from the release position of FIG. 8, the clamp 58 moves inward as indicated by the arrow 68 to clamp the leading edge of the paper 38 firmly against the surface of the drum 54. When rotating in the printing direction of arrow 66, the drum 54 is adapted to stop in the position of FIG. 10 which is the top of sheet position with the clamp 54 adjacent the printing head 18 as shown in FIG. 10 such that the printhead is positioned to print the first line on the paper sheet 38. Note also that when the drum 54 is in the top of sheet position of FIG. 10, the circumference of the drum 54 in relation to the length of the sheet of paper 38 in combination with the spacing of the paper guides 66, 64 is such that the trailing end of the paper 38 falls down in the direction of arrow 70 to rest on the second paper guide 64 for purposes which will become apparent shortly.

Figure 11:
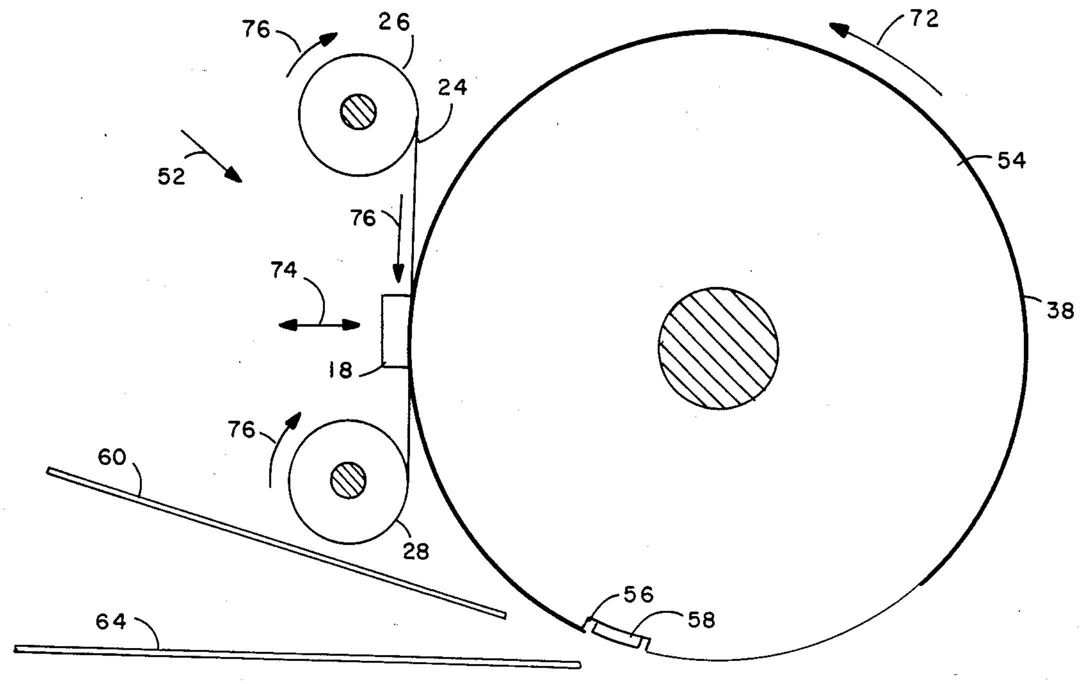
FIG. 11 shows the apparatus of FIG. 8 in its rotational printing process.
Figure 12:
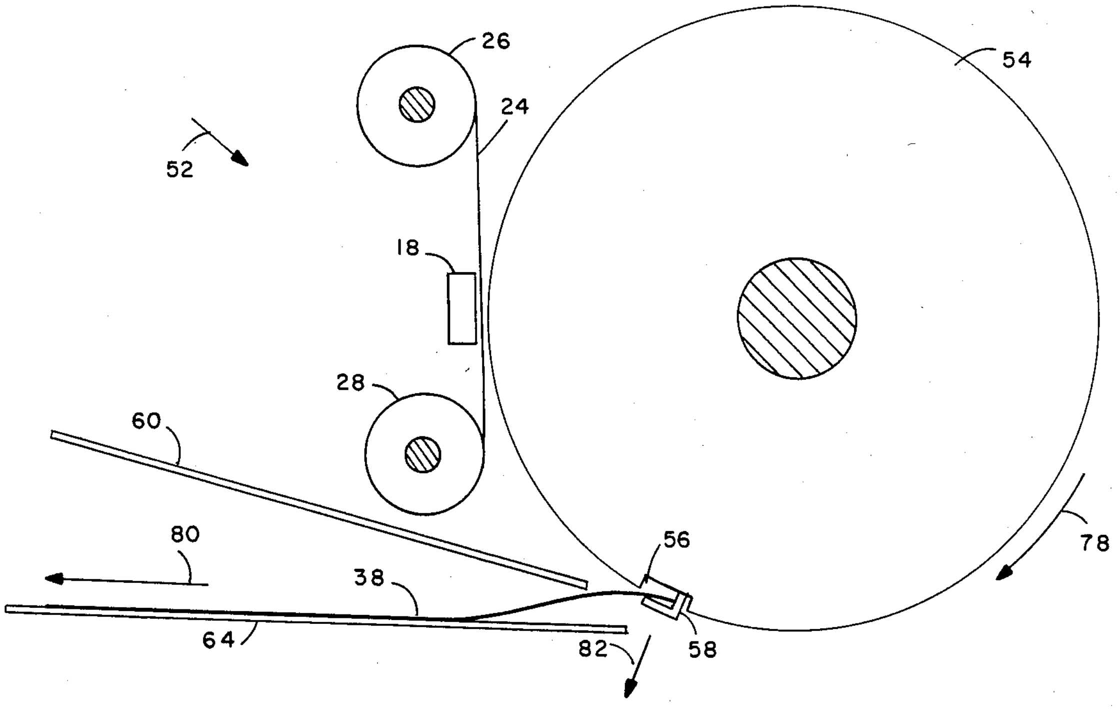
FIG. 12 shows the apparatus of FIG. 8 and its manner of releasing and ejecting a sheet of paper.

The printing sequence of the present invention is shown in FIG. 11. As the drum 54 step rotates in the direction of arrow 72 (continuing in the printing direction) the printhead 18 is moved in and out as indicated by the arrow 74 and the ribbon 24 advanced in the direction of arrows 76 to print the first color. When the last line is printed, the drum continues rotating to the top of sheet position of FIG. 10. The ribbon 24 is adjusted as necessary to position the second color for printing and the drum 54 once again rotates in the printing direction to print the second color. When the second color has been printed, the drum once again stops at the top of sheet position of FIG. 10 while the ribbon is adjusted for the third color and then rotates for a third time in the printing direction to print the third color after which it stops once again at the top of sheet position of FIG. 10. At this point, the previously mentioned positioning of the tail end of the paper 38 on the second paper guide 64 becomes important. The drum 54 is now rotated in its release direction as indicated by the arrow 78 (FIG. 12). The paper 38 is pushed outward along the second paper guide 64 in the direction of arrow 80. As the drum 54 reaches the release position of FIG. 8, the clamp 58 is opened in the direction of arrow 82 allowing the paper sheet 38 to be released and ejected from the print mechanism 52. Note that the clamp 58 only opens adjacent the bottom of its rotational path in the release position of FIG. 8 when drum 54 is rotating in its release direction of arrow 78. If this were not the case, the paper 38 would be released during the printing of the second color as the drum rotated.

Figure 13:
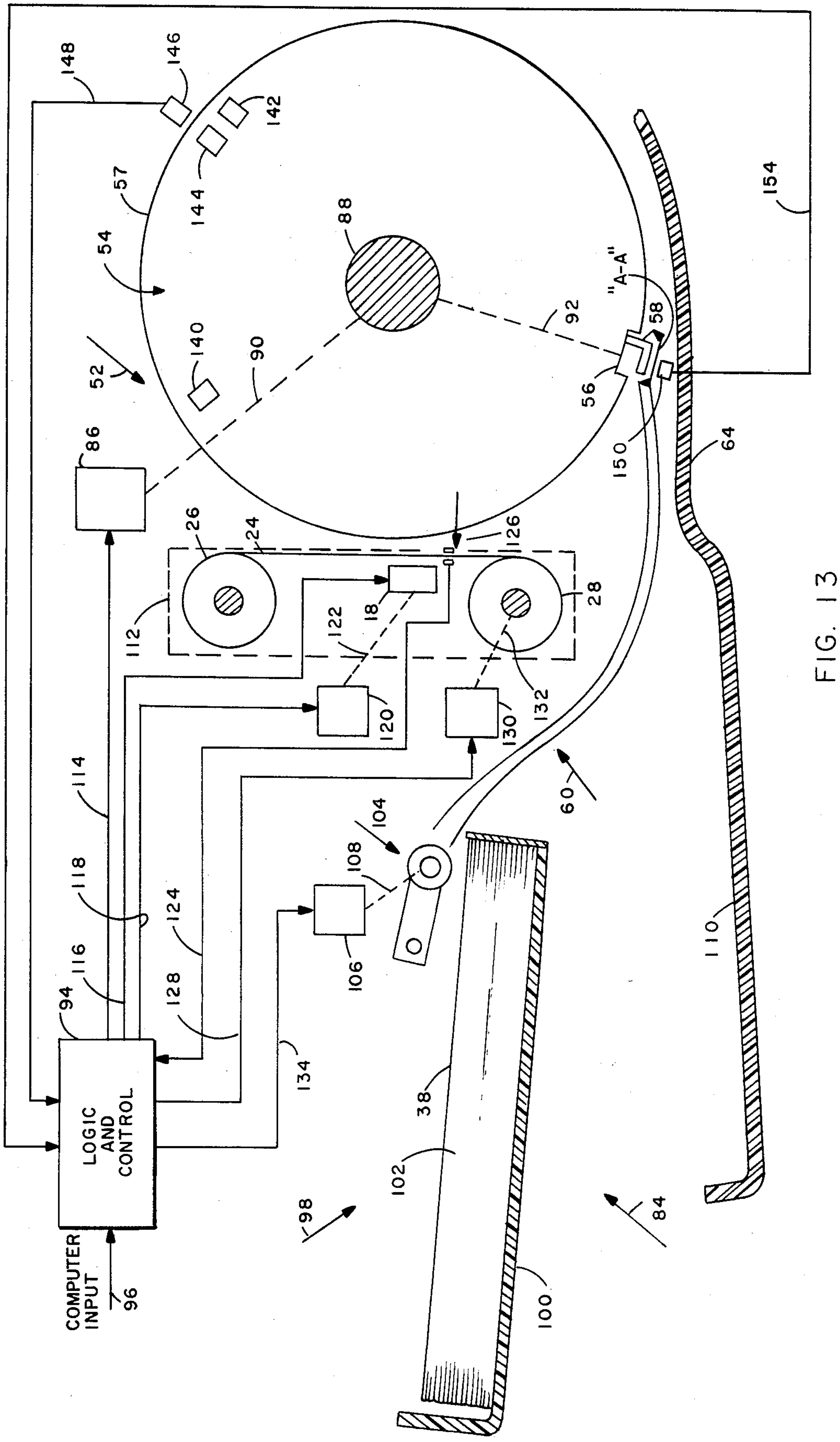
FIG. 13 is a simplified combined cross section and block diagram of a printer according to the present invention.

Turning now to FIG. 13, a printer, generally indicated as 84, is shown in simplified and combined block diagram form to show the basic construction and elements of a proposed commercial embodiment. Printer 84 incorporates the basic print mechanism 52 as described above. The drum 54 has a drive motor 86 operably connected to its driving shaft 88 as indicated by the dotted line 90. As indicated by the dotted line 92, the clamp 58 is operably connected to the driving mechanism 88, 90 to effect the clamping and releasing actions as described above. The clamping mechanism is the subject of a co-pending application also assigned to the assignee of this application being Ser. No. 765,078, filed Aug. 13, 1985, by Albert A. Sholtis and Jon S. Guy and titled, "Drum Clamping Mechanism", the structural details of which are incorporated herein by reference. Reference should be made to that application for details of a preferred clamping mechanism. Methods for rotating the drum 54 and stopping at preselected locations are well known to those skilled in the art and, therefore, to simplify explanation of the present invention and to prevent redundancy, specific discussions thereof are eliminated from this specification. The actions of the drive motor 86 are controlled by a logic and control module 94. The logic and control module 94, in turn, gives its inputs (commands and data) over line 96 from the driving computer.

Printer 84 is provided with a sheet feeder, generally indicated as 98, having a paper tray 100 adapted to hold a stack of sheets of paper 102. A roller assembly 104 is driven by drive 106 as indicated by the dotted line 108 under the control of the logic and control unit 94 in a manner well known to those skilled in the art to inject, on demand, the top sheet of paper 38 from the stack 102 into the first paper guide 60 and thence into the clamp 58 as previously described. The second paper guide 64 connects to an output paper tray 110 into which the paper 38 falls under the force of gravity as it is ejected from the mechanism 52.

As is indicated by the dotted line 112, the paper ribbon 24 and its supply and takeup rollers 26, 28 are disposed within a unique removable/replaceable cassette. Additionally, the logic and control unit 94 is connected to transmit outputs to and receive inputs from various other elements of the printer 84 to accomplish the objectives of the present invention. As previously mentioned, unit 94 is connected by line 114 to the drive motor 86 for rotating the drum 54. Additionally, line 116 is an output line by which the logic and control unit 94 drives the print head 18. Line 118 connects the unit 94 to a driver 120 which, as indicated by the dotted line 122, is used to move the print head 18 in and out towards and away from the surface of the drum 54. Line 124 is an input line to the unit 94 connected to a sensor 126 used to position the various color bands on the ribbon 24. Line 128 connects the unit 94 to a driver 130 which, as indicated by the dotted line 132, drives the takeup reel 28 within the cassette 112 to move the ribbon 24. Line 134 connects the unit 94 to the paper feeder driver 106.

A plurality of reflective position encoders (comprising detent members) 140, 142 and 144 (See FIG. 13), disposed substantially as shown and each having a different reflective strip configuration, extend outwardly from one end of and generally parallel to the longitudinal axis of drum 54, and an infrared sensor 146 is positioned adjacent the outer periphery of the drum 54 outwardly of the same end sensor 146 is arranged to detect the presence of the encoders 140, 142 and 144 as the drum 54 rotates and to have corresponding output signals, transmitted via a line 148 to the logic and control circuitry 94 to indicate that the drum 54 is (1) in its beginning of print position, (2) at a point near its release position and (3) in its release position, respectively.

When the logic and control circuitry 94 receives the output signal from the sensor 146 indicating that the drum is at a point near its release position, the circuitry 94 changes its output on line 114 to the drum drive motor 86 to slow down the speed of drum rotation by applying more torque to the drive motor 86. When the release position encoder 144 is detected by the sensor 146, the output on line 114 is changed to stop the drive motor 86 and rotation of the drum 54.

Figure 15:
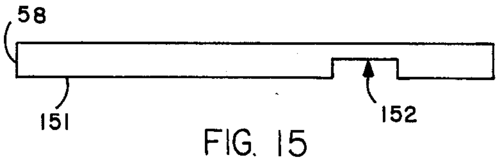
FIG. 15 is a view, taken along lines "A—A" in FIG. 13, showing the clamp in front elevation.

As is shown in FIGS. 13 and 15, the clamp 58 has a notch 152 formed in a portion of the rear (lower) edge 151 thereof and the printer is provided with a second infrared sensor 150 appropriately positioned adjacent and spaced a small distance from the notch 152 when the drum 54 is in its release position. The sensor 150 is energized when the clamp 58 has moved inward into slot 56 to clamp a piece of paper 38 between the clamp 58 and the black rubber surface 57 of the drum 54 and, when a sheet of paper 38 has been clamped to the drum 54 detects the white color and transmits a first ouput signal via a line 154 to the logic and control circuit 94 indicating that the printing operation may begin. If the clamp 58 is clamped in the slot 56 without a sheet of paper below the notch 154 (indicating that the paper supply has been exhausted or that the top sheet 38 of paper has been jammed during the paper feeding operation) or a portion of a sheet of paper is not interposed between the surface 57 and the notch 152 within a predetermined time, the sensor 150 detects the black light level of the surface 57 of the drum 54 within the notch 152 and transmits a second output signal via the line 154 to the logic and control circuitry 94, activating an alarm (if desired) and disabling the printer until after the paper supply/feed problem has been arrested.

Several features of the printer 84 in a practical embodiment as discussed only briefly above are unique and are or will be the subject of their own patent applications. For further details of those features, reference should be made to those applications. In particular, the cassette 112 is described in co-pending application Ser. No. 765,078, filed Aug. 13, 1985, by Albert A. Sholtis and Dean-Yuan Liu and entitled "Thermal Printer Ribbon Cassette", the structural details of which are incorporated herein by reference. The commercial printer is particularly adapted for use as a personal computer screen dump and, accordingly, monitor screen data is transferred to the logic and control unit 94 which contains the ability to rasterize the screen data for output to the mechanism 52 on a line-by-line basis.

Figure 14:
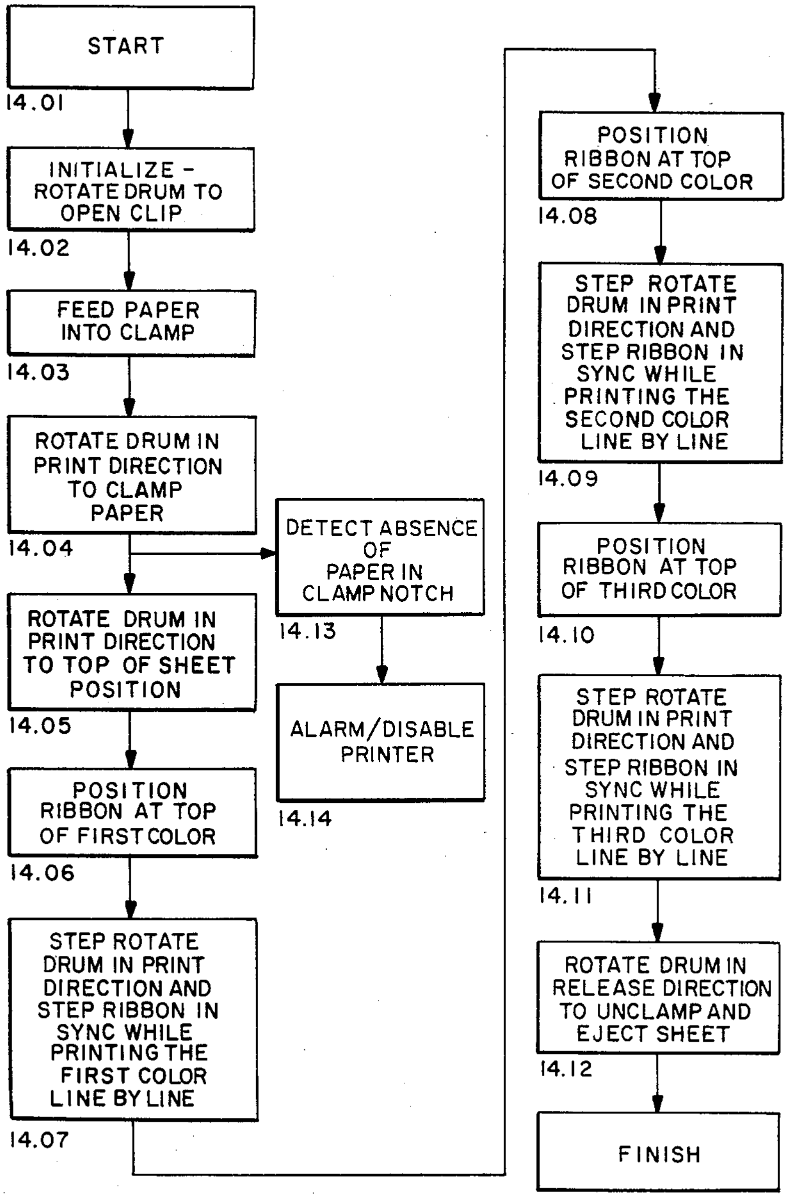
FIG. 14 is a block diagram of the control steps accomplished by the logic of the present invention.

The basic logic accomplished within the logic and control unit 94 for purposes of the basic mechanism of the present invention is shown in FIG. 14. For a print sequence for a page the logic is first started at block 14.01 and at block 14.02, initiatizes the printer by rotating the drum to open the paper clip 58 at block 14.03, the logic causes the sheet feeder roller 104 to feed a sheet of paper 38 from stack 102 into the guide 60 and into the clamp 58. At block 14.04, the logic rotates the drum in the print direction to clamp the paper. At block 14.05, the logic next rotates the drum in the print direction to the top of sheet position. At block 14.06, the logic next positions the ribbon at the top of the first color. At block 14.07, the logic next step rotates the drum in the print direction while simultaneously stepping the ribbon in synchronization while printing the first color line by line. At block 14.08, the logic next positions the ribbon at the top of the second color and at block 14.09, the logic next step rotates the drum in the print direction and steps the ribbon in synchronization while printing the second color line by line. At block 14.10, the logic next positions the ribbon at the top of the third color. At block 14.11, the logic next step rotates the drum in the print direction and steps the ribbon in synchronization while printing the third color line by line. Finally, the logic at block 14.12 rotates the drum in the release direction to unclamp and ejects the sheet of paper into the output paper tray 110.

In the event that a sheet of paper is not clamped to the drum by the clamp 58 at block 14.04, the absence of paper in the notch 152 in clamp 58 is detected by the sensor 150, and an alarm is activated and the printer is disabled (by the control and logic circuitry 94) at block 14.14 until the paper supply situation has been corrected.

Thus, it can be seen that the thermal printer of the present invention has accomplished its stated objectives by removing the necessity of rewinding the paper sheet which affords the benefits of simple construction, reliable and faster operation, automatic realignment of the paper sheet for subsequent color printings to assure exact pixel alignment and simple and reliable release and ejection of paper sheets upon which images have been printed.

Wherefore, having thus described our invention, we claim:

1. In a thermal printer having a thermal print head for selectively generating points of heat traversely across a print path and a driven ribbon having a transferable print medium thereon transported through the space between the print head and a sheet of print receiving media, the improved print media and ribbon drive comprising:

(a) a horizontally disposed rotatable cylindrical drum having the print head in close adjacent parallel-spaced relationship to said drum's outer surface and the ribbon passing between the print head and said outer surface;

(b) releasable clamping means for clamping the edge of a sheet of receiving media to said surface;

(c) drive means for rotating said drum in a first direction being the printing direction and in a second direction, opposite said first direction, being the release direction and for stopping said drum and at first point with said clamping means adjacent the print head when said drum is rotating in said printing direction being the top of sheet point and at a second point with said clamping means adjacent the lowest point of said drum's rotational path when said drum is rotating is said release direction being the release point;

(d) clamp release means carried by said drum and operably connected to said drive means for releasing said clamp means only as said drum is being stopped at said release point when rotating in said release direction;

(e) first guide means for directing a sheet of receiving media onto said suface with its leading edge disposed in said released clamping means when said drum is stopped at said release point;

(f) second guide means for receiving and guiding a sheet of receiving media off of said surface when said drum is rotated between said top of sheet point and said release point in said release direction and said clamping means is released; and, (g) control means connected to said drive means and the driven ribbon for rotating said drum in said print direction to clamp a sheet of receiving media, rotating said drum in said print direction to said top of sheet position, positioning the ribbon at the top of its first color, step rotating said drum in said print direction and stepping the ribbon in synchronization therewith while printing the first color line by line, positioning the ribbon at the top of its second color, step rotating said drum in said print direction and stepping the ribbon in synchronization therewith while printing the second color line by line, positioning the ribbon at the top of its third color, step rotating said drum in said print direction and stepping the ribbon in synchronization therewith while printing the third color line by line, and rotating said drum in said release direction to said release position to unclamp and eject the printed receiving media.

2. The thermal printer according to claim 1 further comprising:

first detection means for sensing when the drum is in said release position and for transmitting an indicium thereof to said control means, said control means being responsive to said indicium to effect feeding of a portion of a sheet of print receiving media between said drum and said clamping means when said clamping means is released.

3. The thermal printer of claim 2 further comprising:

second detection means for sensing the presence or the absence of an edge portion of said sheet of print receiving media interposed between said drum and said clamping means, transmitting a second indicium to said control means if a said portion is present and transmitting a third indicium to said control means when a said portion is absent, said control means being responsive to a said second indicium for rotating said drum in the printing direction to actuate said clamping means to clamp said edge portion of said sheet to said surface of said drum and being responsive to a said third indicium to disable said drive means for rotating said drum.

4. The thermal printer of claim 3 further comprising third indication means for providing a second indication to said first detection means when said drum is in said top of sheet point, said first detection means being responsive to a said second indication to transmit a second indicium to said control means, said control means being responsive to a said second indicium for rotating said drum in said printing direction.

5. The thermal printer of claim 3 wherein:

said first detection means comprises a first reflective member mounted on a surface of said drum and an infrared sensor positioned to detect the presence of the first reflective member and to have an output signal representative thereof to the control means when the drum is rotated into said release position.

6. The thermal printer of claim 5 wherein:

said second detection means comprises a second infrared sensor positioned to detect the light level at a point near the drum surface adjacent the clamping means when said drum is in said release position, having a second output indicium to said control means when a said edge portion of said print receiving media is interposed between said drum surface and said clamping means with said drum in said release position and a third output indicium to said control means in the absence of a said portion of said print receiving media interposed between said surface and said clamping means when said drum is in said release position.

7. The thermal printer of claim 5 further comprising a second reflective member mounted on said surface of said drum and having a different reflective configuration from and being spaced apart from said first reflective member, said second reflective member being positioned so that it passes into proximity to and is detected by the first infrared sensor, as the drum is rotated from said top of sheet point toward said release point, prior to detection of the first reflective detent, the first infrared sensor being responsive to detection of the second reflective member to transmit a second output indicium to said control means for slowing the speed of rotation of said drum as said drum approaches said release point.

* * * * *